(No Model.)

L. B. BURDSAL.
Horse Detaching Device.

No. 239,221. Patented March 22, 1881.

Witnesses:
Floyd Norris
Howell Bartte

Inventor:
Leonard Bishop Burdsal
by Johnson and Johnson
Attys

UNITED STATES PATENT OFFICE.

L. BISHOP BURDSAL, OF BUNKER HILL, ILLINOIS.

HORSE-DETACHING DEVICE.

SPECIFICATION forming part of Letters Patent No. 239,221, dated March 22, 1881.

Application filed December 17, 1880. (No model.)

*To all whom it may concern:*

Be it known that I, LEONARD BISHOP BURDSAL, a citizen of the United States, residing at Bunker Hill, in the county of Macoupin and State of Illinois, have invented new and useful Improvements in Horse-Detaching Devices, of which the following is a specification.

In improving the device for detaching horses from vehicles I also make a very safe and secure trace-fastening. Its construction admits of attachment to the ends of single-trees in a simple and easy manner; and while being perfectly secure as a trace-fastening, its action to effect the detachment of the trace is certain when operated by the driver, so that a runaway or kicking horse or horses can be detached from the trace-fastenings at once. The detachment of the traces is effected simultaneously by cords or straps under the control of the driver. The fastening of the traces is easily and quickly effected, and the device is adapted for use with advantage as a trace-hook.

Figure 1:
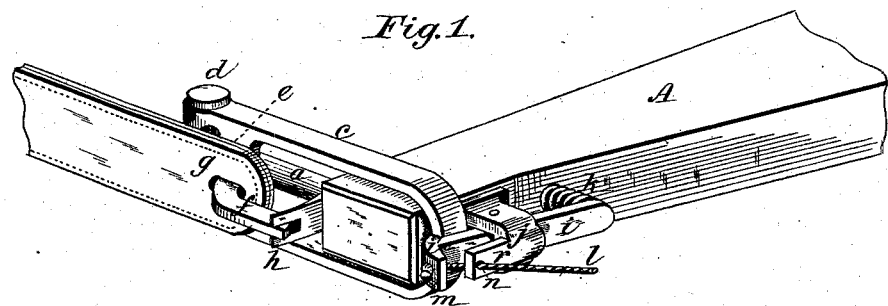
Figure 2:
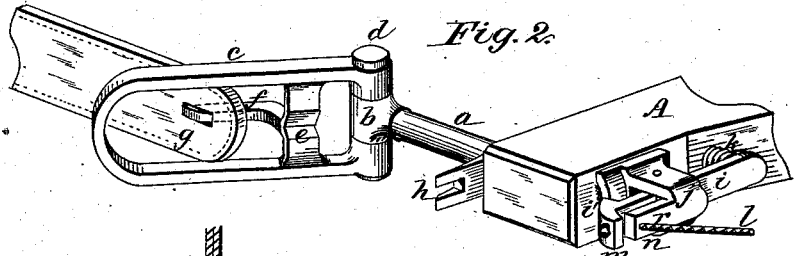
Figure 3:
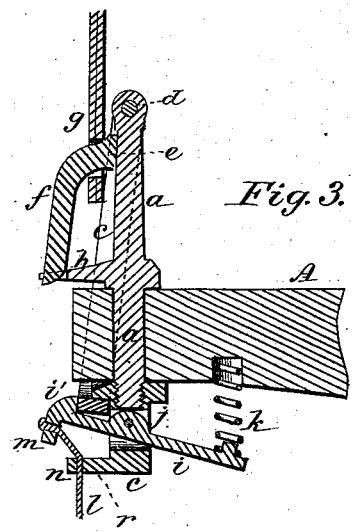

Referring to the accompanying drawings, Figure 1 represents a view, in perspective, of my improved trace fastening and detaching device applied to the end of a single-tree and fastened; Fig. 2, a similar view, showing the trace-hook unfastened and swung back, and the trace in position to be freed. Fig. 3 represents a horizontal section of the device in position as fastened.

The ends of the single-tree A are each provided with an opening to receive the end of an iron stem, $a$, in the line of the fastened trace, and which project frontward a short distance. The ends of these stems $a$ are provided with T-heads $b$, which stand at right angles to the line of the single-tree. A metallic loop, $c$, forms the trace hook and fastening, and is secured by its open end to the T-head by a bolt, $d$, which passes through the loop ends and the T-head, which are enlarged to give strength, and on this bolt the loop is adapted to turn so as to bring its arched end over the end of the single-tree when fastened, and to swing open to the front in line with the stem when unfastened. It is formed with a cross-bar, $e$, near its connected end, from which the tug-hook $f$ proper stands out in position to receive the end $g$ of the trace or trace-ring.

Standing out in line with the tug-hook, and secured to the stem $a$, is a forked arm, $h$, adapted to receive the end of the tug-hook $f$, and thus inclose the tug or ring at the side of the loop and to one side of the loop-carrying stem. The tug-hook slightly curves out from the loop and extends toward the single-tree, so that its end interlocks with the forked end of the arm $h$, and it is impossible for the trace to become unfastened as long as the loop is held in position over the end of the single-tree.

The means for fastening and releasing the free end of the loop is secured at the rear edge of the single-tree, and consists of a pivoted latch, $i$, adapted to hook over the end of the loop and to hold it secure. This latch is pivoted to a metallic piece, $j$, so as to stand in the line of the single-tree, and its hooked end $i'$ is constantly pressed toward the single-tree and over the free end of the loop, when fastened, by a spring, $k$, forcing out the inner end of said latch. The piece $j$ is screwed upon the end of the stem $a$, and thus serves as a nut to secure both the loop-carrying and the catch-carrying parts to the single-tree. In its fastened position the loop $c$ is closed against the nut-piece $j$ over the end of the single-tree and a little out of line with the stem $a$, so that the pull of the trace upon the loop must be in two directions—viz., in the line of the stem $a$ upon the pivot-bolt and outward upon the latch-part $i'$ proper—by reason of the outwardly-inclined position of the loop with respect to the line of pull of the trace. As the trace-hook stands out from the outer side of the loop, and from a point between its pivot-bolt and the single-tree, and as the loop stands outwardly-inclined, as stated, it is obvious that the pull of the trace will cause the loop to fly open and swing to the front the moment it is unlatched, and thus free the tug-hook from its forked arm $h$, and allow the trace to free itself from the hook. The latch end $i'$ is curved, so that the loop, upon being pressed against it, will pass over it and be fastened. The control of the latches by the driver is by a cord, $l$, secured to a projecting end, $m$, of the latch and passing through an eye, $n$, in a projection, $r$, from the nut-piece $j$, so that if, in case of accident, runaway, or from other cause, the driver wishes to detach the horse or horses, he gives the cords a sudden pull, when the loops fly open, the traces fall from their hooks, and the horse is free.

That part of the stem $a$ which is passed through the opening in the end of the single-tree is square in cross-section, which prevents the turning of the stem and holds the loop always in position for operation.

I claim—

1. The combination, in a horse-detaching device, of the stem $a$, provided with the forked arm $h$, and secured to the single-tree, substantially as described, with the loop $c$, pivoted to the front end of said stem, provided with the trace-hook $f$, and adapted to receive the end of the single-tree within said loop when closed, and to be swung out in line with said stem when unfastened, substantially as described.

2. The combination of the stem $a$, provided with the forked arm $h$, the loop $c$, pivoted to said stem, and provided with the trace-hook $f$, with the spring-latch $i'$, the said loop being adapted to receive the end of the single-tree within its free end when closed, and the said latch adapted to hook over the arched end of said loop, substantially as described.

3. In a horse-detaching device constructed substantially as described, the stem $a$, of square cross-section, and having a screw-thread, in combination with the single-tree and the nut-piece $j$, to which the latch $i'$ is pivoted, and having the guide $n$ for the detaching-cord connected with said latch, substantially as specified.

4. The herein-described horse-detacher, consisting of the stem $a$, provided with the forked arm $h$, the loop $c$, pivoted to said stem, and provided with the trace-hook $f$, the latch $i'$, and the nut-piece $j$, secured to said stem, the several parts being constructed, applied to, and adapted for operation upon the end of the single-tree, substantially as specified.

In testimony whereof I have hereunto set my hand in the presence of two subscribing witnesses.

L. BISHOP BURDSAL.

Witnesses:
    CHARLES F. COX,
    AUG. W. BUCHHEIT.